United States Patent [19]

Chupka et al.

[11] 3,947,314

[45] Mar. 30, 1976

[54] METHOD OF TREATING PAPER FIBERS IN A STATIONARY SCREEN

[75] Inventors: David E. Chupka; Donald F. Lehman, both of Middletown, Ohio; Gilbert E. Kohr, Hendersonville, N.C.

[73] Assignee: The Black Clawson Company, Middletown, Ohio

[22] Filed: Apr. 29, 1974

[21] Appl. No.: 465,095

[52] U.S. Cl. ................. 162/55; 162/242; 209/273; 209/306
[51] Int. Cl.² ........................................ D21D 5/22
[58] Field of Search .......... 162/4, 55, 56, 261, 264, 162/242; 209/250, 300, 305, 306, 270, 273, 297; 210/414, 415

[56] References Cited
UNITED STATES PATENTS

| 483,030 | 9/1892 | Volstorf | 209/297 |
|---|---|---|---|
| 2,809,111 | 10/1957 | Durant et al. | 162/55 X |
| 2,900,077 | 8/1959 | Sandison | 209/300 |
| 3,135,193 | 6/1964 | Hunt | 210/415 X |
| 3,188,942 | 6/1965 | Wandel | 210/415 X |
| 3,477,571 | 11/1969 | Maag | 209/306 X |
| 3,616,932 | 11/1971 | Bancroft | 210/415 X |
| 3,736,223 | 5/1973 | Marsh | 162/4 |
| 3,849,302 | 11/1974 | Seifert | 209/273 |

*Primary Examiner*—S. Leon Bashore
*Assistant Examiner*—Richard V. Fisher
*Attorney, Agent, or Firm*—Biebel, French & Bugg

[57] ABSTRACT

A paper fiber treatment system utilizes a screw revolving in a perforated cylinder as a tailings screen in place of conventional vibratory or other screens to separate undefibered fibrous materials or other undesirable solids from the free fibers. The tailings screen may be used, for example, in an otherwise conventional fiber treatment system to screen paper stock, downstream from a pulper for pulping waste paper or refuse containing a high percentage of paper fibers, or downstream of a digester for separating knots or other undefibered wood particles from the cooked fibers ejected from the digester.

8 Claims, 6 Drawing Figures

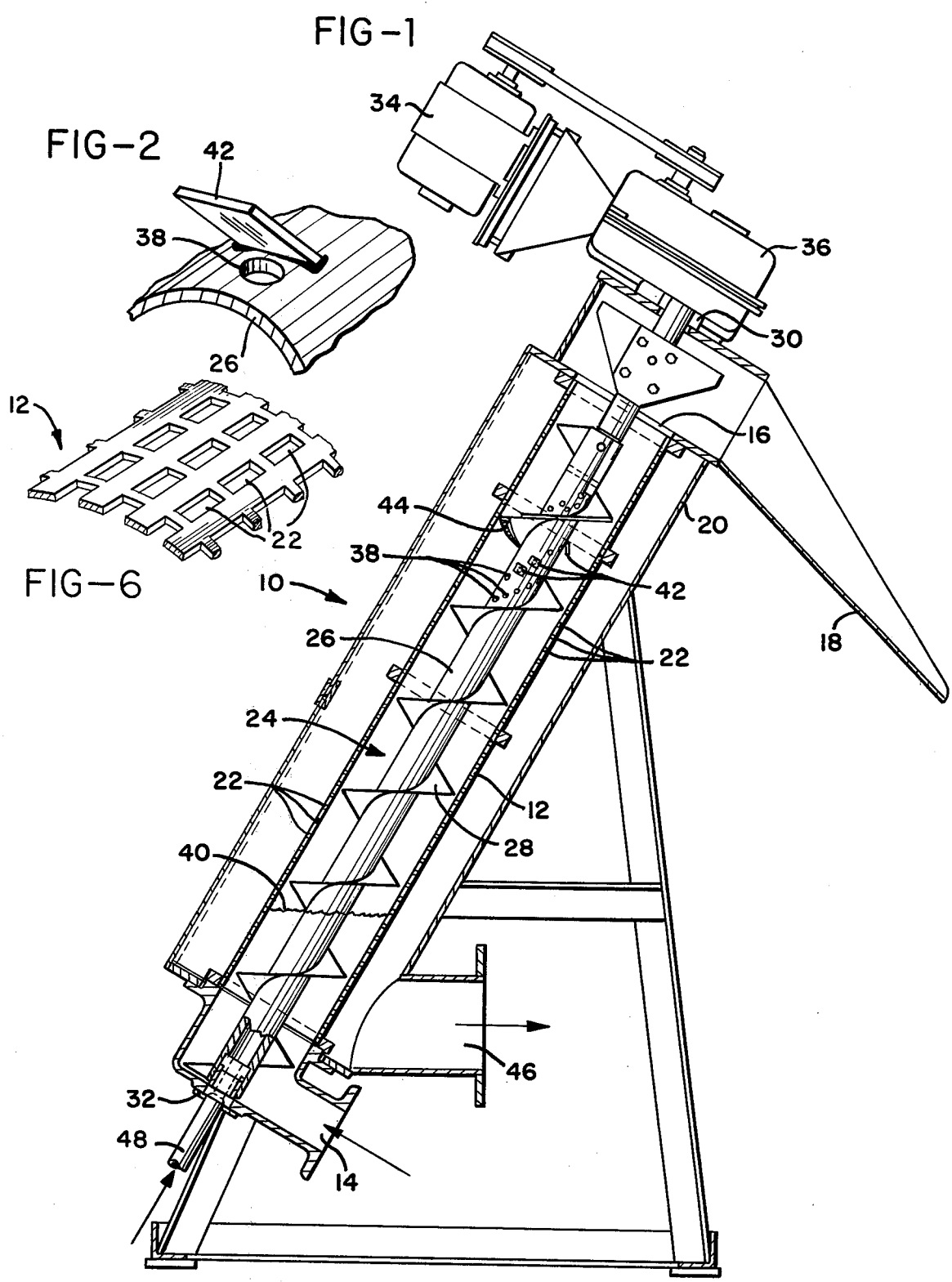

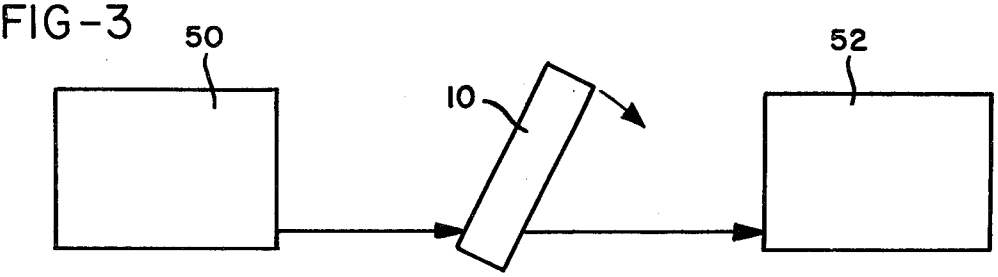
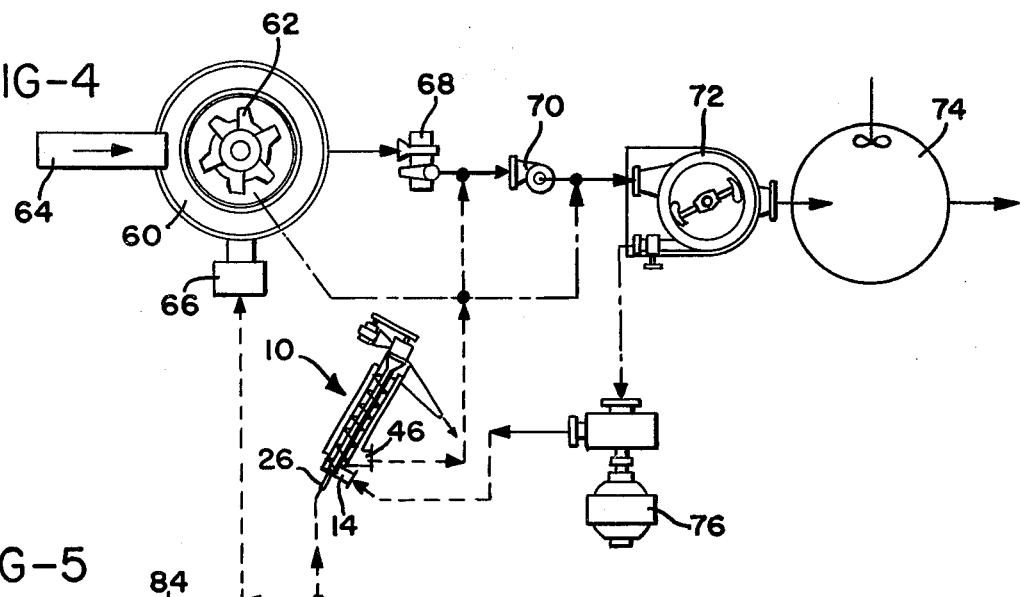
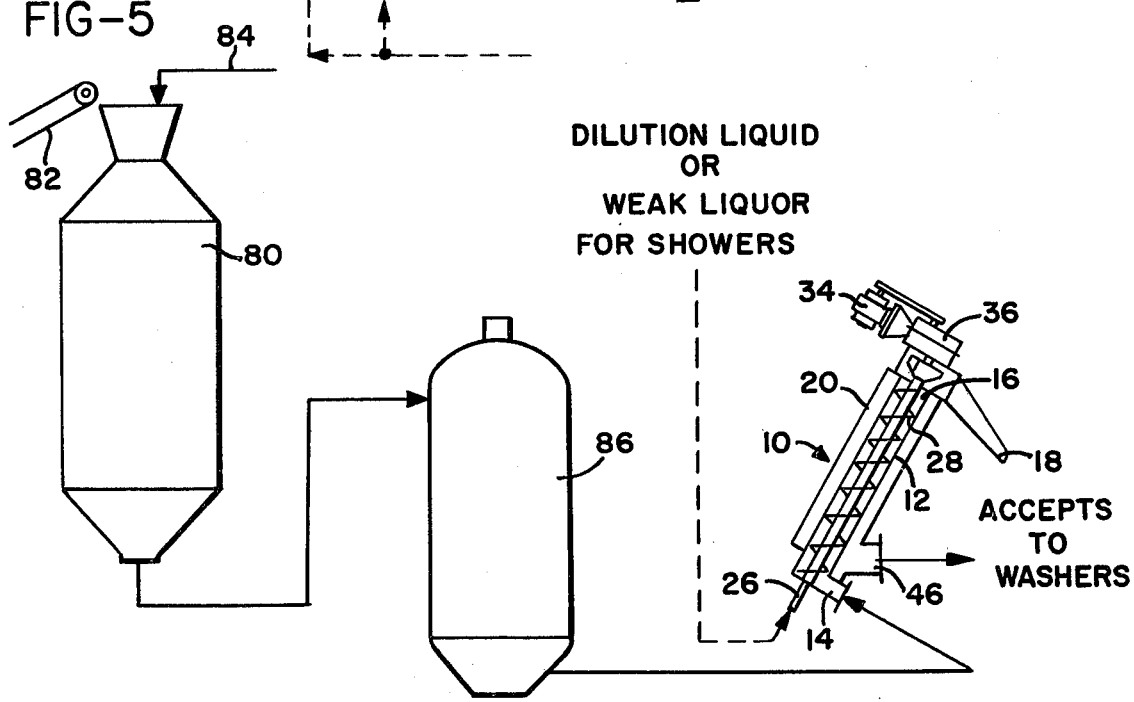
DILUTION LIQUID
OR
WEAK LIQUOR
FOR SHOWERS
ACCEPTS TO WASHERS

METHOD OF TREATING PAPER FIBERS IN A STATIONARY SCREEN

BACKGROUND OF THE INVENTION

In various paper fiber treatment systems it is desirable to separate from the papermaking fibers, contaminants which lower the quality of the fiber. In a conventional fiber treatment system in a paper making operation, for example, the rejects from the primary screening operation are often directed to a so called tailing screen, which separates acceptable fiber ejected from the primary screen with the rejects and directs the fibers reclaimed back into the fiber treatment system while the rejects from the tailing screen are rejected from the system.

Another, less conventional example of a paper fiber treatment system is shown in U.S. Pat. No. 3,736,223, in which solid waste materials, such as typical municipal refuse which contains a high percentage of fibrous materials, are deposited in a pulper tub with a liquid, such as water, and subjected to hydraulic and mechanical shear forces to reduce the frangible solids to a predetermined size before they are extracted in slurry form from the pulper tub together with a portion of the liquid.

The slurry of liquid and frangible solids is thereafter processed through what may be broadly termed screening apparatus to improve the quality of the paper fibers contained in the slurry and separate out undesirable, non-fibrous contaminants. The accepts from the screening apparatus are further processed and the rejects are directed to a tailing screen. There the majority of the solids other than fibers is rejected from the system and the remaining accepts are processed further.

Still another example of a paper fiber treatment system is the digesting operation in a paper making operation, wherein wood chips and cooking liquor are deposited in a digester and the chips cooked with the liquor at elevated temperatures and pressures for some predetermined period of time to break down the wood chips and enable free fibers to be obtained from the chips for further processing. After the digesting operation there will still remain some undefibered solids, such as knots, which must be removed or separated from the acceptable fibers. Therefore, in conventional pulp preparation systems the digesters will be followed by a screening operation to remove undesirable contaminants such as knots.

It will be seen, therefore, that generally tailing screens are used to separate and discharge from the system rejectable material while acceptable material is recirculated and processed further, and, of course, it is important that the rejects be free or almost free of acceptable material. The most common type of screening apparatus used for this purpose is a vibratory screen.

Such screens, however, have many, art recognized undesirable characteristics. For example, the vibrating screens, by their very nature, are noisy and dirty in that they throw off liquids and, to some extent solids, during the screening operation and are generally unpleasant to work around. Additionally, the vibrating screens require special mounting and are susceptible to mechanical failure due to the inertial forces imposed on the apparatus as it vibrates during normal operation.

Screw type thickeners have been used for dewatering in various types of operations. For example, U.S. Pat. No. 3,188,942 shows a screw type thickener for dewatering fibrous material, such as waste material, after it has been disintegrated. Also of interest is U.S. Pat. No. 3,616,932 which discloses a thickener for separating pulp stock and water. An additional patent of interest is U.S. Pat. No. 3,080,065, which again utilizes a screw type thickener for separating a caustic neutralizing solution utilized to remove bottle labels from the labels themselves. A further example in U.S. Pat. No. 2,471,517 which discloses a machine for separating spent hops from wort.

In conventional screw thickeners, the goal generally is to separate as much liquid as possible from the solids carried in suspension in the liquid. In accordance with this goal the perforations in the casing in which the screw revolves are kept as small as possible to minimize the passage of solids through the perforations in the casing. In paper fiber thickening operations this reduces as much as possible the loss of fibers rejected from the thickener with the liquid. In operations where the liquid is valuable, it reduces as much as possible the entrainment of undesirable solids with the liquid.

As a practical matter the minimum size of the perforations in the casing is limited by manufacturing considerations, plate thickness and the required throughput rate for the thickener.

SUMMARY OF THE INVENTION

In accordance with the present invention apparatus is provided which includes a screw revolving in a perforated casing, but which operates in an entirely different manner than screw thickeners and is utilized in paper fiber treatment systems and processes for an entirely different purpose.

Thus, rather than acceptable solids, such as paper fibers, being carried out of suspension by the screw flights while the liquid of suspension drains through the perforated screw casing, the acceptable solids, paper fibers, are collected with the liquid of suspension and the larger, coarse materials are carried upwardly by the screw flights and rejected.

As noted above, except insofar as limited by manufacturing considerations and the desired capacity of the unit, the perforations in the casing of a screw thickener are kept as small as possible to reduce as much as possible the passage of solids, such as fibers, through the casing perforations.

In contrast, in accordance with the present invention the openings through the screw casing are kept as large as possible to allow as much paper fiber as possible to pass through the openings with the liquid, and only coarse rejects are retained in the casing for ejection from the apparatus by the screw flights.

As a result, apparatus in accordance with the present invention is utilized as a screen in place of vibratory and other type screens to provide a slurry of liquid and high quality paper fibers substantially free of contaminants. In use as a tailing screen, it can be utilized for screening rejects from a primary screening system and returning good fibers screened from the rejects back to the system. Where throughput rates are not too high, it can be used as a primary screen. In a digesting operation the screen of the present invention can be utilized as a deknotter for screening knots and other undefibered material from acceptable fibers.

In any case the input will be a mixture of liquid, fibers and coarse, rejectable materials, rather than a slurry of liquid and fibers, as in a screw thickener, and the apparatus will separate desirable fibers and liquid from undesirable coarse solids, with the accepts passing through the casing perforations and the rejects ejected from the system by the screw flights.

BRIEF DESCRIPTION OF THE DRAWINGS

FIG. 1 is an elevational view, partially in section and with parts removed for clarity, illustrating screw type apparatus of the present invention;

FIG. 2 is an enlarged perspective view of a portion of a screw shaft of FIG. 4;

FIG. 3 is a flow diagram illustrating diagrammatically a basic system in accordance with the present invention;

FIG. 4 is a flow diagram showing the present invention applied to a typical system for treating waste materials;

FIG. 5 is another flow diagram showing the present invention applied to the digesting operation of a paper making system; and FIG. 6 shows a portion of a slotted casing.

DESCRIPTION OF THE PREFERRED EMBODIMENTS

FIG. 1 of the drawings shows a preferred embodiment of apparatus 10. Screen 10 consists of an inner perforated casing 12, preferably of cylindrical configuration, extending generally upwardly, preferably in slightly inclined relation to the vertical. The casing 12 has an inlet 14 adjacent its lower end, and adjacent its upper end a rejects outlet 16 feeding a trough 18.

An outer main chamber 20 extends about the casing 12 in spaced relationship thereto and in communication therewith through the perforations 22, which constitute accepts outlet means from the casing 12 into the main chamber. The perforations in the casing may be of a variety of geometric shapes although round holes have been found to perform satisfactorily. The important consideration is that the perforations be large enough to allow the fibers to pass through with the liquid.

In most instances this requires that the perforations have a maximum dimension of no less than 2 millimeters and usually a maximum dimension of no more than 6 millimeters. Of course, where all or most of the contaminants are very large, the size of the openings can be increased accordingly.

Where round holes are used they will have a diameter no less than approximately 2 millimeters, and perforations of square, triangular or other shape will be sized similarly. Slots may also be used and their maximum dimension, their length, will be greater than 2 millimeters. The width of the slots is preferably no greater than approximately 1 millimeter.

A screw 24 consisting of a hollow shaft 26 and the screw flights 28, is rotatably mounted adjacent its upper and lower ends, as indicated at 30 and 32, and driven by a motor 34 through suitable gearing 36. The shaft 26 is provided with perforations 38 at a point thereon above the normal liquid level in the casing 12, indicated by the line 40.

Each of the openings 38 is provided with a deflector 42, as best seen in FIG. 2 of the drawings, although for purposes of clarity some of the deflectors have been omitted from FIG. 4. Additionally, the outer edge of the screw flights 28, or a portion thereof, may be provided with a brush, as indicated at 44, to wipe continuously the inner surface of the casing 12. Again, only a portion of the brush is shown in FIG. 1, although it will be apparent that the brush may extend the length of flights 28, or a portion thereof.

In operation, the mixture of liquid, free fibers and other solids is received by the screen 10 through its inlet 14. As the screw rotates within the casing 12, the free fibers and liquid flow outwardly through the perforations 22 into the outer main chamber, while the other coarse solids are carried upwardly by the screw 24 to the rejects outlet 16 and chute 18.

The liquid and free fibers collected in the main chamber are removed therefrom through the accepts outlet 46 positioned adjacent the lower end of the main chamber. To wash any free fibers that may have collected on the other solids as they are conveyed upwardly out of the system by the screw 24, shower water may be supplied to the hollow shaft 26 through the pipe 48, the shower water passing through perforations 38 and being deflected downwardly by deflectors 42 toward the lower end of the perforated casing 12. As a result, the useful fiber recovery rate of the apparatus is increased by reducing the amount of valuable paper fibers carried out with the rejected solids through the outlet 16.

It will be seen therefore, that in operating the screen 10, the feed into inlet 14 consists of a mixture of liquid and fibers having a substantial amount of solid rejects. The consistency of the accepts from the inner casing will usually be less than 3% by weight of fibers, and for many operations, about ½% by weight of fibers. This can be attained by controlling the consistency of the feed into the casing 12, by the amount of shower liquid ejected through the perforations 38, or both.

The material passing through the perforations 22 constitutes the accepts of the process and the material carried upwardly by the flights 28 constitutes the rejects. This is in contrast to the usual screw thickening operation wherein the objective is to carry all suspended solids upwardly by means of the screw flights while only liquid drains out through perforations in the casing surrounding the screw.

It will also be noted that with the present invention the accepts passing through the perforations 22 consist of liquid and the bulk of the paper fiber fed into the apparatus and from which the rejects have been separated. In conventional screw thickening operations the bulk of the paper fiber is removed by the screw flights and ejected at the top.

Understandably, in a conventional thickener the amount of fibers passing through the perforations with the liquid is kept as low as possible. To do this the perforations in the casing in which the screw revolves are kept as small as possible. As noted above, the minimum size of these openings is limited by manufacturing considerations and the desired throughput for the apparatus. Except insofar as limited in this regard, however, the openings are kept as small as possible.

In contrast in the screen 10, the perforations 22 are kept as large as possible so that as much fiber as possible will pass through the perforations 22. Thus, if the perforations are round holes, the diameter of the perforations 22 will be generally in excess of 2 millimeters. As a practical matter in order to avoid an excess of rejects from escaping with the accepts, the perforations will generally not be in excess of 6 millimeters, although it will be appreciated that when working with fibers containing relatively large contaminants the openings may even be increased above 6 millimeters.

Conversely, smaller holes may be required for the rejection of very fine contaminants.

In any case, it will be seen that the basic principles of operation of apparatus in accordance with the present invention are exactly the opposite of those governing the design and operation of conventional screw thickening apparatus.

FIG. 3 of the drawings shows schematically a basic system in accordance with the present invention. Thus, a supply 50 of pulp slurry containing contaminants of some type is conveyed to a screen 10 with rejected material being ejected from the top of the screen while accepted materials, paper fibers and liquid, are directed to further treatment or storage apparatus 52.

In a specific application of the invention as seen in FIG. 4, the supply of liquid, paper fibers and contaminants may come from pulping apparatus, such as a pulping tub 60 having a rotor 62 rotatably mounted in the bottom thereof and fed with materials high in paper fiber content, such as waste paper or refuse containing a high proportion of fibrous materials. The tub, which may be of the type shown in U.S. Pat. No. 3,595,488, may be fed by a conveyor 64 while liquid, such as water, is fed into the tub from any convenient source, as indicated at 66.

From the tub 60, a pump 68 conveys the pulped material, which will consist of liquid, free fibrous material, undefibered fibrous material and other solids, to a cleaner such as a cyclone cleaner 70 where, typically, heavy inorganic solids are removed from the system. Thereafter, the resulting slurry is conveyed to a screening apparatus 72 which delivers liquid and accepted fiber to a stock holding chest 74 while rejecting the remaining material to a deflaker 76 for further comminution thereof.

From the deflaker 76, the material is conveyed to a screen 10 in accordance with the present invention, where liquid and free fibers are separated from undefibered materials and other solid contaminants as described above. The latter are rejected by the screen, while the accepted material is returned to the system, either upstream or downstream of the cyclone 70 as desired.

In the system described above, paper making fibers are extracted from waste paper or other wastes containing a high proportion of fibrous material, such as refuse. It will be apparent, however, that the present system may be utilized for screening paper making fibers to remove many other types of contaminants. An example of another system is the screening of fibers following a digesting operation, where the contaminants are essentially fibers but in undefibered form, such as knots.

With reference to FIG. 5 of the drawings, a system of this type is shown, including a digester 80 provided with wood chips from a conveyor 82 and with cooking liquor through the conduit 84. After cooking at elevated temperatures and pressures for a predetermined amount of time, the contents of the digester 80 are expelled from the digester to the blow tank 86. The resulting mixture of spent cooking liquors, free fibers and undefibered fibrous materials, such as knots, is diluted and then directed to the inlet 14 of the screen 10.

As in the system described above in connection with FIG. 4 of the drawings, the material passes through the inlet 14 into the casing 12, from which the spent cooking liquor and free fibers are expressed through the perforations in the casing into the outer main chamber 20. The contaminants, such as knots, are conveyed upwardly by the screw flights 28 to be ejected through the rejects outlet 16 for disposal or further treatment.

Weak liquor or other diluting liquid may be pumped into the hollow shaft 26 to spray the knots being rejected from the system and remove free fibers clinging to the knots to improve the yield of the system. The accepted material, that is, the spent liquor and free fibers, are then directed to further processing. In applications of this type, the consistency of the accepts will be in the range of ¾% to 2% by weight of fiber. Additionally since the size of the rejects will be fairly large, the maximum dimension of the openings in the casing can be increased up to approximately twenty millimeters.

While specific systems in accordance with the present invention are described above, it will be apparent that screen 10 is capable of general application to paper fiber treatment systems for screening paper pulp, regardless of how the pulp is prepared originally. Systems in accordance with the present invention therefore may be characterized broadly as using a screw type apparatus for screening a supply of contaminant containing paper stock to separate the contaminants from the paper fibers and liquid of suspension.

While the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A method of treating paper fibers in a screen which includes a stationary perforated inner casing, a stationary outer chamber surrounding said casing, a screw mounted for rotation within and extending longitudinally of said casing, means for rotating said screw in a direction such that material deposited in one end of said casing is carried to the opposite end of said casing by rotation of said screw, means defining an inlet into said casing adjacent said one end thereof, means defining an accepts outlet from said chamber, and means defining a rejects outlet from said casing adjacent said opposite end thereof, said method comprising the steps of:

a. feeding a mixture of liquid and fibers containing a substantial amount of solid rejects into said stationary, perforated, inner casing through said inlet thereinto,
   b. draining substantially all of said liquid and accepted fibers through perforations in said stationary, perforated, inner casing into said chamber while retaining substantially all of said solid rejects within said casing,
   c. rotating said screw within and with respect to said stationary inner casing and conveying said solid rejects retained in said stationary casing from said one end to said opposite end thereof,
   d. discharging said solid rejects through said rejects outlet at said opposite end of said stationary casing,
   e. collecting said liquid and fibers draining through said stationary perforated casing in said chamber surrounding said casing, and
   f. removing liquid and accepted fibers from said chamber through said accepts outlet.

2. The method of claim 1 wherein said step of collecting said liquid and fibers comprises:

a. collecting said liquid and fibers in slurry form at a consistency less than 3% fibers by weight.

3. The method of claim 2 wherein said step of collecting said liquid and fibers comprises:
   a. collecting said liquid and fibers in slurry form at a consistency of approximately ½% of fibers by weight.

4. The method of claim 1 wherein said step of collecting said liquid and fibers comprises:
   a. collecting said liquid and fibers in slurry form at a consistency of approximately ¾% to 2% of fibers by weight.

5. The method of claim 1 further comprising:
   a. pulping liquid, fibrous materials and nonfibrous solids to defiber said fibrous materials mechanically, and
   b. conveying liquid, defibered fibrous materials and nonfibrous solids from said pulper tub to said perforated casing for feeding into said casing.

6. The method of claim 1 further comprising:
   a. depositing a mixture of cooking liquor and wood chips in a digester and cooking said wood chips, and
   b. conveying said mixture to said perforated casing for feeding into said casing.

7. The method of claim 1 further comprising:
   a. delivering additional liquid to the interior of said perforated casing.

8. The method of claim 7 wherein said step of delivering additional liquid comprises:
   a. conveying the solid rejects upwardly by said screw means towards the rejects outlet and
   b. spraying the solid rejects being conveyed upwardly to wash free fibers therefrom.

* * * * *